United States Patent
Koulomzin

(10) Patent No.: US 10,102,848 B2
(45) Date of Patent: Oct. 16, 2018

(54) HOTWORDS PRESENTATION FRAMEWORK

(71) Applicant: Google LLC, Mountain View, CA (US)

(72) Inventor: Daniel G. Koulomzin, Jamaica Plain, MA (US)

(73) Assignee: Google LLC, Mountain View, CA (US)

( * ) Notice: Subject to any disclaimer, the term of this patent is extended or adjusted under 35 U.S.C. 154(b) by 329 days.

(21) Appl. No.: 14/206,737

(22) Filed: Mar. 12, 2014

(65) Prior Publication Data
US 2015/0248885 A1 Sep. 3, 2015

Related U.S. Application Data

(60) Provisional application No. 61/946,254, filed on Feb. 28, 2014.

(51) Int. Cl.
*G06F 3/16* (2006.01)
*G10L 15/08* (2006.01)

(52) U.S. Cl.
CPC ........ *G10L 15/08* (2013.01); *G10L 2015/088* (2013.01)

(58) Field of Classification Search
CPC ...................................................... G10L 21/00
See application file for complete search history.

(56) References Cited

U.S. PATENT DOCUMENTS

| | | | |
|---|---|---|---|
| 6,349,132 B1 | 2/2002 | Wesemann et al. | |
| 6,400,806 B1 | 6/2002 | Uppaluru | |
| 6,622,284 B1 | 9/2003 | Naffziger et al. | |
| 6,999,932 B1 * | 2/2006 | Zhou ..................... | G06F 17/275 704/235 |

(Continued)

FOREIGN PATENT DOCUMENTS

WO 2009/124887 10/2009

OTHER PUBLICATIONS

White Paper, "Guidelines for Speech-Accessible HTML for Dragon NaturallySpeaking and Dragon Medical," 2009 Nuance Communications, Inc., Slideshow Presentation, 10 pages.

(Continued)

*Primary Examiner* — Shreyans A Patel
(74) *Attorney, Agent, or Firm* — Fish & Richardson P.C.

(57) ABSTRACT

A computer system can include a hotword manager, a hotword detection module, and a browsing application. The hotword manager can maintain information for a plurality of hotwords that correlates identifiers for the hotwords with respective representations for the hotwords. The hotword detection module can listen for spoken input and detect when spoken input corresponds to one of the plurality of hotwords. The browsing application can (i) parse an electronic document to identify respective identifiers for one or more hotwords included in the electronic document, (ii) generate a display of the electronic document that includes respective representations for the one or more hotwords, the respective representations obtained from the hotword manager using the identifiers for the one or more hotwords included in the electronic document, and (iii) perform a particular set of operations in response to identifying spoken input for a particular hotword included in the electronic document.

20 Claims, 7 Drawing Sheets

(56) References Cited

U.S. PATENT DOCUMENTS

| | | |
|---|---|---|
| 7,174,509 B2 | 2/2007 | Sakai et al. |
| 2005/0033582 A1 | 2/2005 | Gadd et al. |
| 2011/0209041 A1 | 8/2011 | Haq |
| 2013/0117675 A1* | 5/2013 | Twig ................. G06F 17/30867 715/737 |
| 2013/0282381 A1* | 10/2013 | Mauro .................... G06F 3/167 704/275 |
| 2014/0012586 A1 | 1/2014 | Rubin et al. |
| 2015/0212791 A1* | 7/2015 | Kumar .................... G06F 3/167 715/728 |

OTHER PUBLICATIONS

Satrom, "Using voice to drive the web: Introduction to the Web Speech API," Adobe.com, Jan. 14, 2013 [retrieved on Mar. 12, 2014]. Retrieved from the internet: URL<http://www.adobe.com/devnet/html5/articles/voice-to-drive-the-web-introduction-to-speech-api.html>, 9 pages.

Shires, "Voice Driven Web Apps: Introduction to the Web Speech API," HTML5 Rocks, Jan. 14, 2013 [retrieved on Mar. 12, 2014]. Retrieved from the internet: URL<http://updates.html5rocks.com/2013/0/Voice-Driven-Web-Apps-Introduction-to-the-Web-Speech-API>, 7 pages.

\* cited by examiner

HOTWORDS PRESENTATION FRAMEWORK

CROSS-REFERENCE TO RELATED APPLICATION

This application claims priority to U.S. Application Ser. No. 61/946,254, filed on Feb. 28, 2014, the entire contents of which are hereby incorporated by reference.

TECHNICAL FIELD

This document generally relates to speech recognition.

BACKGROUND

Speech has become an increasingly popular mode of human-machine interaction. As the number and types of devices that users interact with on a daily basis has grown, speech detection and other speech recognition techniques have offered a convenient and efficient means for users to input information to a computing device. Some users find speaking input to be preferable to typing input with either a physical or virtual keyboard. Accordingly, some computing devices are configured to recognize hotwords that are spoken by a user, and to respond by performing operations associated with the spoken hotword. Hotword detection can obviate the need for users to input information on a device through other means, such as typing, that may be tedious or otherwise less convenient than speaking a hotword. Hotwords can enable users to issue verbal commands to a computing device. The popularity of hotword detection and other speech recognition techniques is expected to grow.

SUMMARY

This document generally describes techniques for implementing hotwords in computer applications, webpages, and other electronic content, and for providing hotword representations in the applications, webpages, and other electronic content, that signify the presence of hotwords to a user.

In some implementations, a computer system includes a hotword manager, a hotword detection module, and a browsing application. The hotword manager can maintain information for a plurality of hotwords that correlates identifiers for the hotwords with respective representations for the hotwords. The hotword detection module can listen for spoken input and detect when spoken input corresponds to one of the plurality of hotwords. The browsing application can (i) parse an electronic document to identify respective identifiers for one or more hotwords included in the electronic document, (ii) generate a display of the electronic document that includes respective representations for the one or more hotwords, the respective representations obtained from the hotword manager using the identifiers for the one or more hotwords included in the electronic document, and (iii) perform a particular set of operations in response to identifying spoken input for a particular hotword included in the electronic document.

These and other implementations can optionally include one or more of the following features. The hotword manager can be further configured to receive a request from the browsing application that includes the respective identifiers for the one or more hotwords in the electronic document, and to respond to the request with the respective representations for the one or more hotwords.

The hotword detection module can be further configured to notify the hotword manager or the browsing application upon detecting spoken input that corresponds to one of the plurality of hotwords.

The respective representations for the plurality of hotwords can include text of one or more terms for each hotword. The browsing application can be further configured to generate the display of the electronic document by inserting into the display of the electronic document respective text of one or more terms that correspond to the hotwords having identifiers in the electronic document.

The respective representations for the plurality of hotwords can include a graphical element for each hotword, and the browsing application can be configured to generate the display of the electronic document by inserting into the display of the electronic document respective graphical elements that correspond to the hotwords having identifiers in the electronic document.

The hotword manager can be further configured to maintain multiple representations for each hotword and to select one of the multiple representations to provide to the browsing application based on a location or language associated with the one or more computing devices or a user of the one or more computing devices.

The electronic document can include a webpage and the respective identifiers for the one or more hotwords in the electronic document can include HTML tags.

The particular set of operations configured to be performed in response to identifying the spoken input can be defined by JavaScript code associated with the electronic document. In some implementations, the particular set of operations that is configured to be performed in response to identifying the spoken input can be included with or in addition to the document to be executed by a framework or browser.

The browsing application can include at least one of the hotword manager and the hotword detection module.

The system can further include an operating system on the one or more computing devices that includes at least one of the hotword manager and the hotword detection module.

The browsing application can be configured to visually distinguish the representations for the one or more hotwords in the display of the electronic document from other content in the display of the electronic document.

The browsing application can be configured to display a common graphical element with each representation for the one or more hotwords in the display of the electronic document, the common graphical element indicating that voice operations are associated with each representation for the one or more hotwords.

The system can further include a conflicts manager that is configured to select, in response to receiving spoken input for a particular hotword in an electronic document, a particular set of operations from among multiple sets of operations, wherein the electronic document includes multiple instances of the particular hotword, each instance of the particular hotword being associated with a respective set of operations in the multiple sets of operations.

In some implementations, a computer-implemented method can include receiving information that includes identifiers for a plurality of hotwords and that includes respective representations for the hotwords. The method can further include receiving, from an application, a request for a representation for a requested hotword, the request including an identifier for the requested hotword. Using the identifier from the request, the representation for the requested hotword can be retrieved from among the respective representations for the hotwords. In response to the request, the representation for the requested hotword can be returned to the application.

These and other implementations can optionally include one or more of the following features. The method can further include receiving, from a hotword detector, an indication of spoken input that corresponds to the requested hotword, and sending, to the application and in response to receiving the indication of the spoken input, information to cause the application to perform one or more operations associated with the requested hotword.

The application can include or be a web browser and the identifiers for the plurality of hotwords can be identified from markup code for a webpage being loaded by the web browser.

The respective representations for the hotwords can include text of one or more terms that indicate respective actions associated with the hotwords.

The method can further include identifying a geographic location or a language associated with the request. Retrieving the representation for the requested hotword can include selecting the representation for the requested hotword from among multiple available representations for the requested hotword based on the geographic location or the language associated with the request, wherein each of the available representations for the requested hotword can be associated with a respective geographic location or language.

The information that includes the identifiers for the plurality of hotwords and that includes the respective representations for the hotwords can be based on a pre-defined standard for voice interaction on a computing device.

In some implementations, a computer-implemented method can include receiving, by a first application, computer code for a structured electronic document, the computer code including an identifier for a first hotword, the first hotword being one of a plurality of pre-defined hotwords. The method can further include obtaining a representation for the first hotword using the first hotword identifier and parsing the computer code to generate a display of the structured electronic document, the display of the structured electronic document including the representation for the first hotword. The method can receive an indication of spoken input that corresponds to the first hotword, and, in response to receiving the indication of the spoken input, performing one or more operations associated with the first hotword.

These and other implementations can optionally include one or more of the following features. Obtaining the representation for the first hotword can include providing the first hotword identifier to a hotword manager in a request for a hotword representation, and receiving, as having been sent from the hotword manager in response to the request, the representation for the first hotword.

The method can further include formatting the representation for the first hotword in the display of the structured electronic document to visually distinguish the representation for the first hotword from other content within the display of the structured electronic document.

Particular implementations of the subject matter described in this specification may realize one or more of the following advantages. Application developers and webpage authors can more easily add hotword detection capabilities to applications, webpages, or other electronic documents. Hotword representations can be dynamically selected for insertion into an application, webpage, or other electronic document based on context and criteria associated with a computing device, a user of the device, or the application, webpage, or other electronic document into which the representations are to be inserted. Hotword detection and selection of hotword representations can be implemented in different languages among multiple client devices without any change in the code for an application, webpage, or other electronic document. Hotword representations can be formatted for display in distinction from other content in an application, webpage, or other electronic document to signify that a computing device may accept spoken input for a hotword. Hotwords can be included in a webpage using a simple markup language tag in web code for the webpage. Hotwords can be coded and identified using unique identifiers that specify individual hotwords from among multiple hotwords. Browsers and other applications can access hotword representations from a local hotword manager that can maintain a registry of hotwords correlating hotword identifiers with representations for the hotwords. In some implementations, application developers can utilize a framework that recognizes hotword indicators in application code. The framework can provide the required capabilities to render a visual representation of hotwords in the application and to detect when a hotword has been spoken and to notify the application of when the hotword in spoken. The application developer may code or otherwise specify particular operations to perform in response to the detection of hotwords, while relying on the framework for rendering and detection capabilities.

BRIEF DESCRIPTION OF THE DRAWINGS

Like reference numbers and designations in the various drawings indicate like elements.

DETAILED DESCRIPTION

This document generally describes techniques for managing hotwords in an electronic document or a computer application. Hotwords are generally terms or phrases that, when spoken by a user, are recognized by a computing system or device and that cause the computing system or device to perform operations in response. For example, an e-mail application may be programmed to recognize when a user speaks certain commands such as "Forward," "New Message," and "Open Address Book," and to perform respective operations associated with each term or phrase. Likewise, a media application may be programmed to recognize terms such as "Play," "Stop," and "Shuffle." Increasingly, as the use of mobile devices (e.g., smartphones and tablets) and other devices that employ non-traditional input means (e.g., input other than by a keyboard or mouse) becomes more widespread, developers are seeking to provide users with additional or alternative means for interacting with their content. For example, some users may prefer to use voice interaction capabilities of their devices, such as hotwords, rather than typing input through a virtual keyboard on a touch sensitive display. As computing devices become increasingly adapted to handle voice interaction, including hotword detection, the techniques described herein can help both developers who produce content and users who consume the content to harness these voice capabilities. Among other things, this document describes a framework for adding hotword detection capabilities to applications, documents, or other electronic content, and for efficiently identifying and processing hotwords for presentation at a user device.

Figure 1:
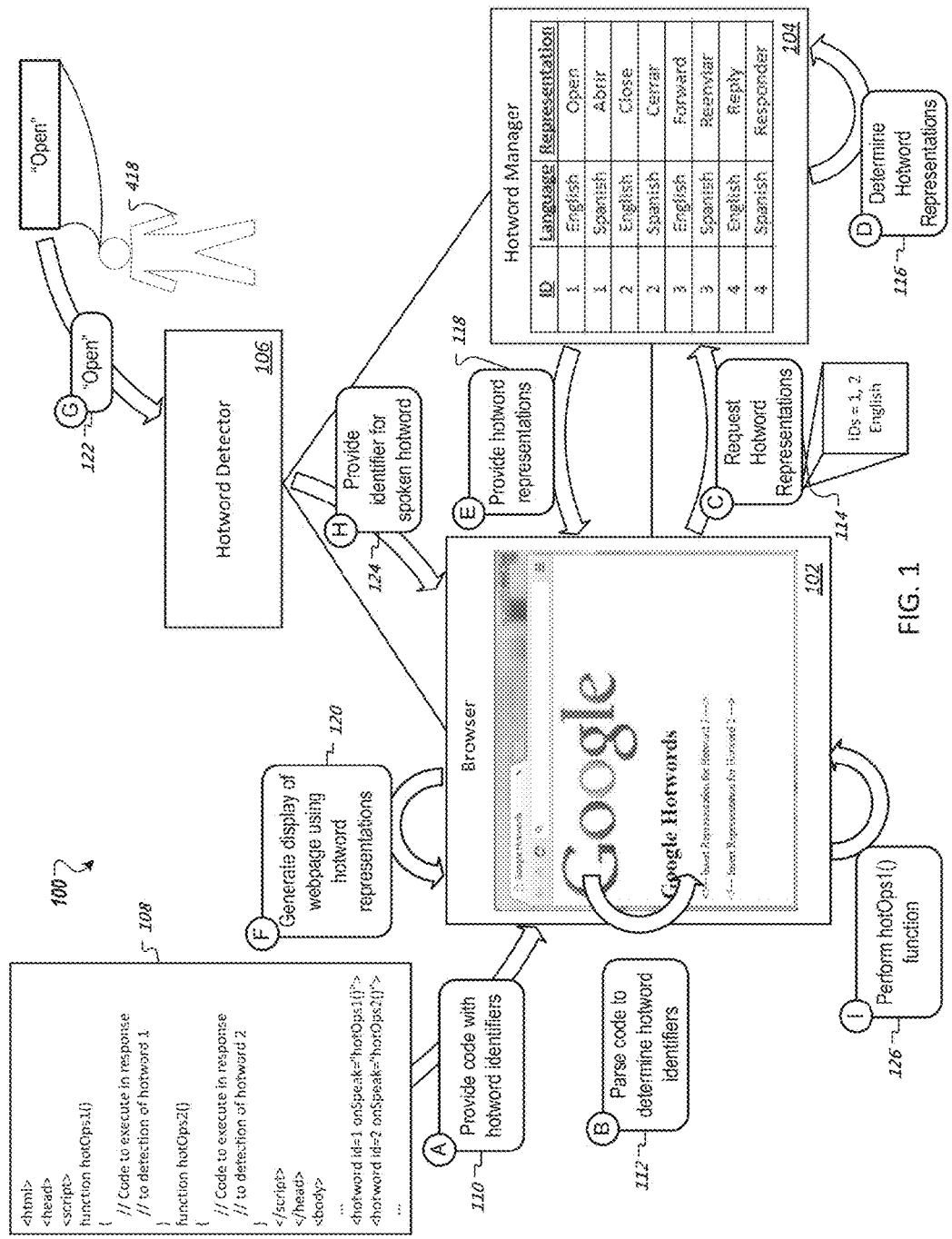
FIG. 1 is a schematic diagram of an example system for incorporating hotwords into a webpage.

With reference to FIG. 1, an example system 100 is shown for incorporating hotwords into a webpage or other electronic content. The system 100 includes a browser 102, a hotword manager 104, and a hotword detector 106. The browser 102, hotword manager 104, and hotword detector 106 can be implemented as software on a personal computing device, such as a smartphone, tablet, or desktop or notebook computer, or any combination of them may be implemented remotely. For example, the hotword detector 106 may be hosted by a server remote from the personal computing device on which the browser 102 and hotword manager 104 are installed, and the hotword detector 106 may communicate with the personal computing device over a network. Generally, the system 100 is configured to provide hotword detection or other voice interaction capabilities to electronic content and to add visual hotword representations to the content that identifies the presence of a hotword to a user. Although the system 100 is discussed with reference to providing hotwords in a webpage displayed by a web browser 102, the techniques discussed in this specification can also be used to provide hotwords in other electronic content, such as application user interfaces, presentations, or word processor documents that can be executed by respective applications other than a web browser 102.

At operation A (110), the browser 102 receives code 108 that includes hotword identifiers. The code 108 can be provided, for example, by a web server that is remote from a computing device on which the browser 102 is running, and may be provided in response to an HTTP request from the browser 102. In some implementations, the code 108 can be web code for a webpage. The web code 108 may include multiple pieces of interrelated code, for example, that define the structure, style, and functionality of the webpage. For example, the web code 108 may include, in one or more files, hypertext markup language code ("HTML"), cascading style sheets ("CSS"), and JavaScript code.

The code can 108 can include one or more hotword indicators that identify hotwords that are to be included in the webpage. The hotword indicators can be markup language tags that the browser 102 is configured to interpret as adding hotwords to the webpage. For example, the code 108 includes two tags that specify two hotwords to add to the webpage. The hotword tags can be included in the body of the document, in some implementations, so that representations for the hotwords are displayed in the webpage at locations that correspond to the location of the tags in the HTML body. Hotword-specific tags can be used to include hotwords in the webpage, such as the <hotword> tags shown in the example code 108. In some implementations, other HTML tags may be used to indicate the inclusion of hotwords such as an anchor tag that includes an attribute or other property understood by the browser 102 as being directed to hotwords. The <hotword> tags in code 108 include respective values for an "id" attribute and an "onSpeak" attribute. The value of the "id" attribute can indicate a particular hotword, from among a plurality of pre-defined hotwords, that the hotword tag corresponds to and that is to be included in the webpage. Each hotword in the plurality of hotwords can be assigned a unique identification value known to both the system 100 and to the author or developer of the webpage so that the browser 102 can recognize which hotword(s) the code is referencing by the value of the "id" attribute. For example, the first hotword tag with an "id" of 1 can correspond to an "Open" hotword, and the second hotword tag with an "id" of 2 can correspond to a "Close" hotword. The identifiers may be numeric values or character strings (e.g., "Open," "Close") in some examples.

The code 108 can also indicate one or more operations for the computing device to perform when the device detects that a user has spoken one of the hotwords included in the webpage. In some implementations, the hotword indicators in the code 108 can specify which operations are associated with each hotword. For instance, each of the <hotword> tags defined in code 108 include respective values for an "onSpeak" attribute that indicate respective JavaScript functions to execute in response to detecting one of the hotwords from spoken input at the device. For example, the first <hotword> tag with "id" 1 instructs the browser 102 to perform the "hotOps1( )" JavaScript function when hotword 1 is detected. Respective JavaScript functions are defined for each hotword in the code 108. In some implementations, certain operations may be associated with particular hotwords by default so that, even if the code 108 does not explicitly specify responsive operations for a hotword, the browser 102 or other components of the system 100 can identify default operations to perform. For example, a "Play" hotword can be previously associated with default operations to begin playing a video, audio, or other media sequence in the webpage. The browser 102 can recognize from the hotword identification value that a tag is for the "Play" hotword, even when the tag does not explicitly identify a function that is programmed to play the media sequence. In some implementations, the hotword tag can include a reference identifier that indicates, for example, the subject of responsive operations. For example, a hotword tag for the "Play" hotword can include an attribute value identifying the particular video, audio, or other media sequence that is be played when the "Play" hotword is detected from spoken input.

At operation B (112), the browser 102 parses the code 108. The browser 102 can build a document object model ("DOM") for the webpage, for example, that represents the structure of the webpage and that is used in executing the webpage for display to a user. As the code 108 is parsed, the browser 102 can identify the hotword indicators (e.g., <hotword> tags) from the code 108. From the hotword indicators, the browser 102 can determine the hotword identifier values and other relevant information for processing the hotwords in the webpage.

At operation C (114), the browser 102 requests representations for the hotwords specified in code 108 from the hotword manager 104. In some implementations, the browser 102 can request information from the hotword manager 104 that can be used to style or format the hotword representations as well. Hotword representations can be displayed by the browser 102 within the displayed content of the webpage. The hotword representations can indicate to users particular hotwords that that have been included in the webpage. For example, the webpage may include text that reads "Say Reply to e-mail Bob." The term "Reply" in this string of text may be a hotword representation inserted into the content of the document by the browser 102 at a place indicated by a <hotword> tag in code 108 that corresponds to a "Reply" hotword. In some implementations, hotword representations may include text, graphical elements, audio, or a combination of these. The browser 102 may also be configured to format or stylize hotword representations in the display of the webpage in a visually distinctive manner that indicates the representation is associated with hotword detection or other voice interaction capabilities. In some implementations, a microphone icon or other graphical element may be displayed near each hotword representation in the webpage.

The hotword representations can be obtained by a request to the hotword manager 104. The browser 102 can send one or more requests to the hotword manager 104 to retrieve respective representations for each of the hotwords in code 108 that were identified during operation B (112). The requests can include the unique hotword identification values for each hotword in the webpage, along with any additional information that the hotword manager 104 can use to determine the appropriate hotword representation to return to the browser 102. For example, the browser 102 can send, in one or more requests to the hotword manager 104, the hotword identifiers "1," and "2" that specify which hotwords are included in the webpage, and a language identifier, "English," that indicates the language for the requested hotword representations. For example different representations for a hotword may be used for different languages depending on the primary language used in other content in the webpage, location data, or language preferences that are associated with the browser 102, the computing device executing the browser 102, and/or a user of the computing device. In some implementations, the language identifier need not be included in the request from the browser, and the hotword manager 102 may independently identify an appropriate language, for example, from user preferences stored with the hotword manager 104. In some implementations, the browser 102 can include other context information or criteria in the request to the hotword manager 104 that can be used to determine an appropriate hotword representation that satisfies the request. For example, the request may indicate whether text, graphical, or audio representations are preferred, or information about the style, formatting, or theme for the requested hotword representation(s).

At operation D (116), the hotword manager 104 determines one or more hotword representations that satisfy the request from the browser 102. The hotword manager 104 can obtain the requested representations from a repository of hotwords data that correlates unique identifier values for each of a plurality of hotwords with one or more respective representations for each hotword in the plurality of hotwords. In some implementations, the repository can be stored with and maintained by the hotword manager 104. In some implementations, the hotword manager 104 may access the repository from a remote location. The repository may be a database, table, or other data structure that holds the information that correlates the hotword identifiers with the hotword representations. For example, the table depicted in the representation of the hotword manager 104 in FIG. 1 shows a set of four hotwords that each have an English representation and a Spanish representation. The hotwords shown in the table may be a subset of a larger list of hotwords included in the repository. In some implementations, the list of hotwords in the repository can correspond to a public registry of hotwords that comport with a standard for implementing voice interaction on computing devices. Thus, webpages and other electronic content that comport with the standard can use hotword identifiers to enable hotword detection in a simplified manner that will be recognized by the computing devices that implement the standard. In some implementations, applications, sites, or webpages may register hotwords with the hotword manager 104, and the hotword manager 104 can assign a unique identifier for the registered hotword on the computing device. In some implementations, the repository of hotwords data can include classifiers or other context data that indicate certain attributes for the hotword representations. For example, the table shown in hotword manager 104 includes a language classifier that indicates whether each representation is an English or Spanish representation.

Using the information received from the browser 102 in the request, the hotword manager 104 can perform a query on the repository of hotwords data or can perform a lookup on the repository to determine the hotword representations that satisfy the request. For the hotword identifiers 1 and 2, and language classifier "English," the hotword manager 104 can determine that the representations "Open" and "Close" are responsive to the request from the browser 102. At operation E (118), the hotword manager 104 returns the determined hotword representations to the browser 102 in satisfaction of the request.

At operation F (120), the browser 102 can generate a display of the webpage using the hotword representations obtained from the hotword manager 104. The browser 102 can insert the hotword representations into the display of the webpage at locations corresponding to the locations of the <hotword> tags in the code 108. For example, the illustration of the webpage in the window of browser 102 shows two placeholders (<!-Insert Representation for Hotword 1-> and (<!-Insert Representation for Hotword 1->) in the display of webpage 108 that are substituted with the hotword representations "Open" and "Close" at operation F. In some implementations, the placeholders are not displayed by the browser 102, and the page is initially generated by the browser 102 with the hotword representations that have been obtained from hotword manager 104.

At operation G (122), the hotword detector 106 receives an indication of spoken input that includes one of the hotwords presented in the webpage. Once the webpage has been fully generated with the appropriate hotword representations at operation F (120), user 418 may interact with the webpage by speaking one of the hotwords defined in the webpage. The hotword detector 106 may actively listen for spoken input from the user 418, and may detect when the spoken input includes a hotword. In some implementations, the hotword detector 106 may detect when any hotword known to the hotword detector 106 is detected, of which the hotwords from the webpage may be a subset. In some implementations, the hotword detector 106 may be configured to detect only the hotwords from the webpage. For example, the browser 102 and/or the hotword manager 104 can notify the hotword detector 106 of which hotwords are included in the webpage so that the hotword detector 106 can be configured to determine when these hotwords are spoken. At operation G, the hotword detector 106 determines that the user 418 has spoken "Open," one of the hotwords enabled in the webpage.

At operation H (124), the hotword detector sends a notification that one of the hotwords from the webpage has been detected from spoken input. In some implementations, the hotword detector 106 may send the notification to the browser 102. In some implementations, the hotword detector 106 may send the notification to the hotword manager 104, or to another component, and the browser 102 may be notified indirectly from the hotword manager 104 or the other component as appropriate.

At operation I (126), browser 102 performs one or more operations in response to receiving the notification from hotword detector 106 that a hotword has been detected as having been spoken. The browser 102 can identify from the notification which hotword was detected, and then determine the corresponding operations to perform in response. For example, in response to the user 418 speaking the "Open" hotword (id=1), the browser 102 has identified from the first <hotword> tag in the received code 108 that the "hotOps1( )" JavaScript function is associated with the detected hotword. Accordingly, the browser 102 can execute the "hotOps1( )" function in response to the detection of the first hotword, "Open."

Figure 2A:
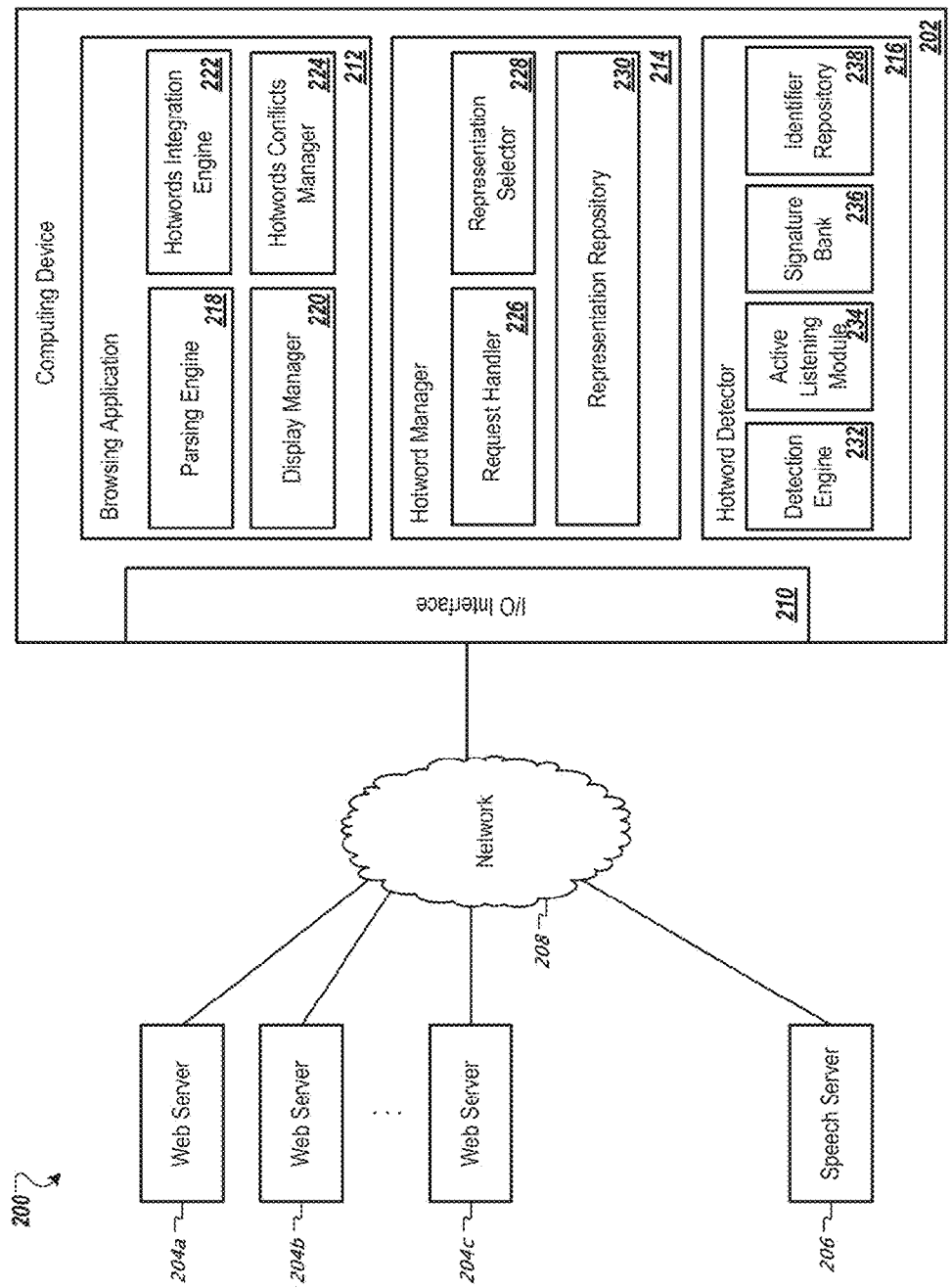
FIG. 2A is a schematic diagram of an example computing system for managing hotwords that are to be included in a presentation of electronic content.

With reference to FIG. 2A, a schematic diagram is depicted of a computing system 200 for managing hotwords that are to be included in a presentation of electronic content. The system 200 includes a computing device 202 that communicates over network 208, such as the Internet, with a speech server 206, and a plurality of web servers 204a-n. The computing device 202 can include an I/O interface 210 through which the device 202 communicates over the network 208, a browsing application 212, a hotword manager 214, and a hotword detector 216. The browsing application 212 can be a standard web browser, for example, that interprets web code provided by one of the web servers 204a-n to present webpages and web applications to a user of the computing device 202. The hotword manager 214 generally maintains data that correlates, for each of a plurality of hotwords, an identifier for the hotword with one or more representations of the hotword. The browsing application 212 can send requests to the hotword manager 214 that include identifiers for particular hotwords, and the hotword manager 214 can respond to the request by returning representations for the particular hotwords to the browser 212, which the browser 212 can use in a presentation of a webpage, for example. The hotword detector 216 can be a module on the computing device 202 that listens for spoken input from a user, and that identifies when spoken input corresponds to a hotword. When a hotword has been identified from spoken input, the hotword detector 216 can notify the browsing application 212 and/or the hotword manager 214 so that the computing device can identify operations to perform in response to the spoken input.

Figure 2C:
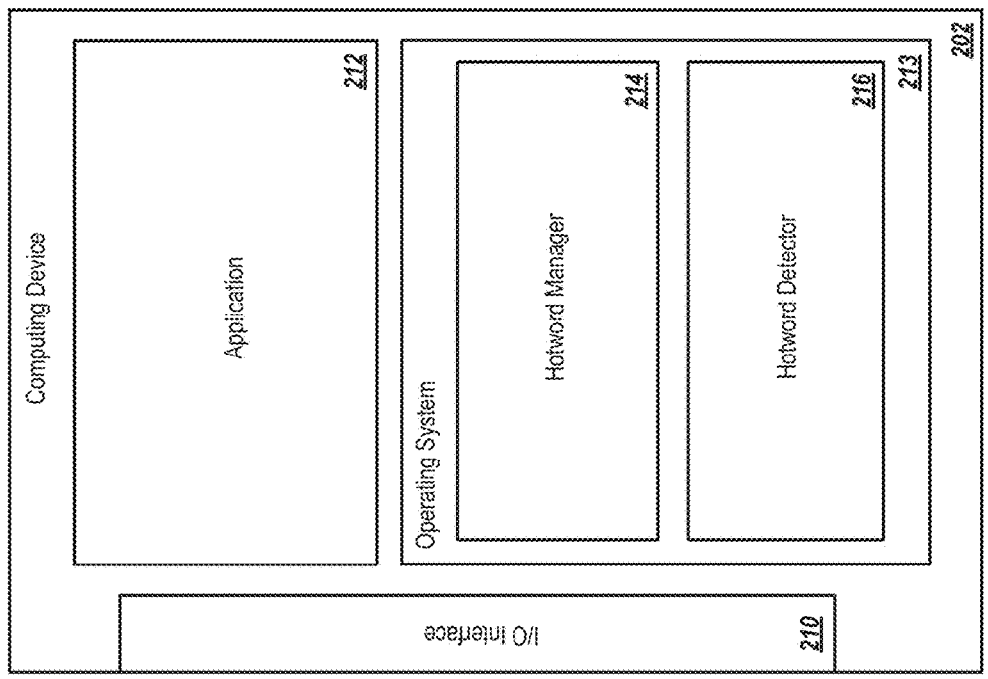
FIG. 2C is a schematic diagram of an example computing device for managing hotwords that are to be included in a presentation of electronic content.
Figure 2B:
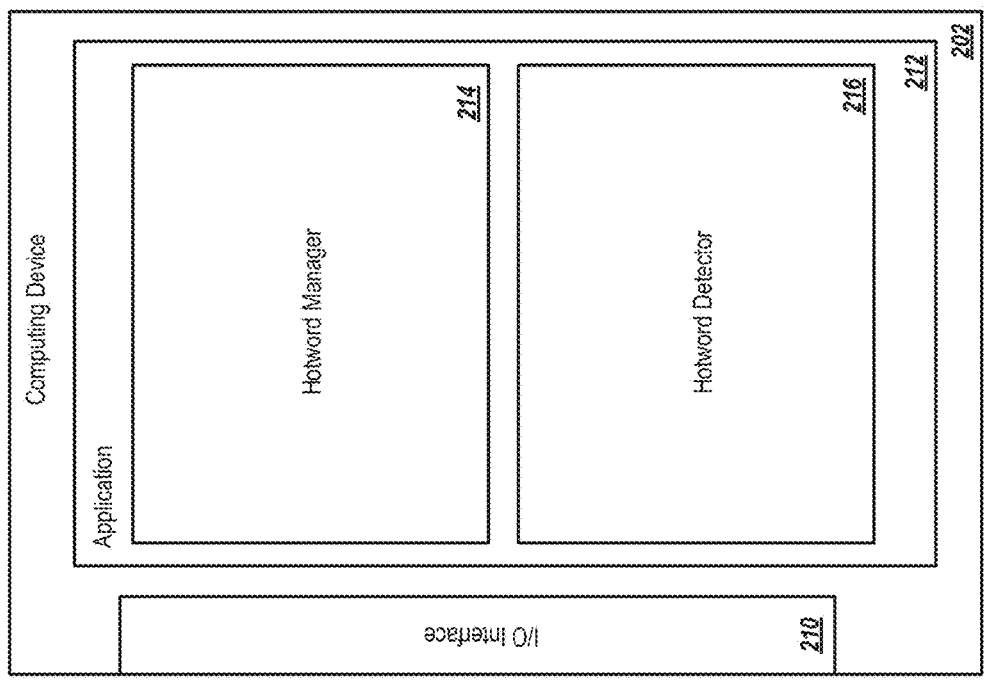
FIG. 2B is a schematic diagram of an example computing device for managing hotwords that are to be included in a presentation of electronic content.

In some implementations, the browsing application 212 can be another type of computer application 212 other than a browser. For example, application developers may utilize a framework on the computing device 202 to code applications 212 of various types in a manner that leverages the capabilities of a hotword manager 214 to identify visual representations of hotwords to display in an application and a hotword detector 216 to identify a hotword when spoken by a user and to alert the application 212 of the spoken hotword. In some implementations, as shown in FIG. 2B, either or both of the hotword manager 214 and the hotword detector 216 may be a part of the application 212 (natively, or as a plug-in or extension, for example). In some implementations, as shown in FIG. 2C, either or both of the hotword manager 214 and the hotword detector 216 may be operating system 213 components that the application 212 can communicate with to implement hotword detection capabilities in the application 212. In some implementations, the hotword manager 214 and/or the hotword detector 216 may be provided as remote services that the computing device 202 communicates with over the network 208. For example, the computing device 202 may provide audio data to a remote hotword detector 216, such as speech server 206, and the speech server 206 can return a textual transcription of the audio or information that indicates when a hotword has been spoken in the audio data. The components of system 200 are described in greater detail below.

The web servers 204a-n can provide various forms of electronic content to the computing device 202. In some implementations, the web servers 204a-n and the computing device 202 may have a client-server relationship such that the computing device 202 sends requests, such as HTTP requests, to the web servers 204a-n, and the web server 204a-n returns content to the computing device 202 that is responsive to the requests. The web servers 204a-n may be separate and remote from computing device. The web servers 204a-n may serve code or other data to the computing device 202 for webpages, applications, and/or web services, for example. In some implementations, the web servers 204a-n can serve content that is to be executed by computing device 202 using voice interaction services of the device 202, including hotword services. For example, one of the web servers 204 may respond to a request from computing device 202 with code (e.g., HTML, CSS, JavaScript) for a webpage that includes one or more hotword identifiers that represent respective hotwords that are to be embedded in the webpage. The hotword identifiers may be arranged to identify a hotword associated with the identifier and to indicate a location within a display of the webpage that a representation of the hotword is to be displayed. The hotword identifier itself, or another portion of code that is separate from the hotword identifier, can identify a set of operations for the computing device 202 to perform when the hotword is identified with the spoken input. For example, a JavaScript function that is served in conjunction with markup language for a webpage may be associated with one or more hotwords. The code for the webpage can identify that the JavaScript function is to be called and executed upon detection of a spoken hotword that is associated with the JavaScript function.

The speech server 206 can provide speech recognition services for the computing device 202. The speech server 206 communicates with the computing device 202 over network 208, such as the Internet, a local area network, or a wide area network. The speech server 206 may be separate and remote from the computing device 202. The speech server 206 may be configured to receive requests from the computing device 202 to process speech data for spoken input received by the device 202. In some implementations, the speech data may represent audio samples for all or a portion of the spoken input. In response to a request from the computing device 202, the speech server 206 can interpret the speech data from the request and return data to the computing device 202 that has been determined using the speech data. Depending on the particular request and the particular services provided by the speech server 206, the speech server 206 may respond to a request in various manners. For example, the speech server 206 may be programmed to perform speech-to-text conversion of the speech data and to return a textual transcription of the spoken input to the computing device 202. In some implementations, the speech server 206 may detect signatures for one or more hotwords from the spoken input, and may return an identifier or other representation of the one or more hotwords to the computing device 202. For example, a user may be browsing a webpage on computing device 202 that includes an embedded video. The video may be associated with the hotword "Play" to cause the browser to begin playing the video. The computing device 202 listens for spoken input as the user interacts with the webpage. When spoken input is received, the computing device 202 can send a request to the speech server 206 that includes audio data corresponding to the spoken input. The speech server 206 determines whether the spoken input matches a hotword, and if so, sends an indication of the matched hotword to the computing device 202. For example, the speech server 206 may return a character string for the hotword (e.g., "Play"), or any other unique identifier for the hotword that is understood by both the speech server 206 and the computing device 202. The speech server 206 may also send an indication of whether the spoken input matches any hotwords that were identified by the computing device 202 and included in the request to the speech server 206. For example, the computing device 202 may send a request to the speech server 206 that includes both the speech data for the spoken input and information that identifies that the webpage being browsed on the device is configured to respond to the hotword "Play." The speech server 206 can then process the speech data, determine whether the user likely spoke the term "Play," and notify the computing device 202 in response to the request whether the spoken input matched the term "Play." In some implementations, as discussed further below, the computing device 202 may include a local hotword detector 216 that obviates the need for remote services provided by speech server 206.

The computing device 202 can be a user device such as a desktop computer, a notebook computer, a smartphone, or a tablet computer. In some implementations, the computing device 202 may be included in an appliance or a vehicle system, such as an onboard media or vehicle navigation system. The computing device 202 can include one or more components for implementing a hotword management and presentation framework. As shown in FIG. 2A, for example, the computing device 202 includes browsing application 212, hotword manager 214, and hotword detector 216. The computing device 202 can also include an I/O interface 210, such as a wireless interface chip for communicating with other computers over network 208 that are remote from computing device 202.

The hotword manager 214 can maintain information about a plurality of hotwords for the computing device 202. The hotword manger 214 can include a request hander 226, a representation selector 228, and a representation repository 230. Generally, the hotword manager 214 can provide hotword services to one or more applications on the computing device 202, including to the browsing application 212. The hotword manager 214 can be configured to respond to requests from applications that include hotword functionality with representations of the hotwords that are enabled by the requesting application. In some implementations, the hotword manager 214 may be a native application or service installed on the computing device 202. The hotword manager 214 can be an application or a service that is implemented separately from the browsing application 212. In some implementations, the hotword manager 214 may be part of browsing application 212, or may be an extension or plug-in for the browsing application 212. In some implementations, the hotword manager 214 may define an application programming interface ("API") that may be called by other applications on the computing device 202, such as browsing application 212, to obtain respective representations for one or more hotwords from the hotword manager 214.

The request handler 226 receives requests from other applications on the computing device 202 for hotword representations. The request handler 226 can be configured to receive requests from one or more applications on the device 202, and one or more instances of a particular application. For example, the browsing application 212 may be loading a first webpage that includes a first hotword identifier in a first window or tab of the browsing application 212, and may also be loading a second webpage that includes a second hotword identifier in a second window or tab of the browsing application 212. The request handler 226 can process each of the requests from the browsing application, to cause the hotword manager to identify respective hotword representations for each of the requests, and to respond to the appropriate instance of the browsing application 212 with the representations responsive to each request.

The hotword manager 214 can further include a representation repository 230 that includes data correlating identifiers for a plurality of hotwords with one or more respective representations for each of the plurality of hotwords. The repository 230 can be stored on non-volatile memory of the computing device 202. In some implementations, the data in the repository 230 can be stored in a data structure such as a table or a database on the computing device 202.

One example of a portion of a table that includes information correlating hotword identifiers and representations is hotwords table 104 from FIG. 1. The information from table 104 can be maintained by the representation repository 230 within hotword manager 214. The hotwords table 104 includes a plurality of entries for multiple hotwords. For example, four different hotwords are explicitly depicted in FIG. 1, although the table 104 can include additional hotwords as well that are not shown in the drawing. Each hotword is uniquely identified by an identifier value. For example, the "Open" hotword has an identifier value of "1," and the "Close" hotword has an identifier value of "2." Thus, developers can insert particular hotwords into their content (e.g., webpages, applications) by inclusion of the unique identifier for the intended hotword. For example, the "Open" hotword may be placed in a webpage by including a tag in the HTML for the webpage, which the browsing application 412 is configured to interpret as a hotword element, that includes its corresponding identifier value, "1." Similarly, the "Close" hotword may be inserted through an HTML hotwords tag having an identifier value of "2."

Each of the hotwords may be associated with one or more different representations for the hotword. The representations for the hotword are representations that can be included in a presentation of electronic content that includes hotwords. The representations may be textual representations, graphical elements, audible representations, or a combination of these. For example, textual representations for each hotword are shown in hotwords table 104. Thus, when a browsing application encounters a hotword tag with an identifier value of "4," the hotword manager 214 can provide the browsing application with the string of characters for "Reply" that is the textual representation of a hotword with an identifier value of "4." The browsing application 212 can be configured to insert the "Reply" text into a display of a webpage wherever a hotwords tag is encountered with an identifier value of "4." As described in greater detail below, the browsing application 212 can format the displayed hotword representation in a manner that indicates that the text is associated with hotword functionality. In some implementations, graphical elements such as icons may be used as hotword representations. For example, an envelope may represent a "Mail" hotword, and a reverse arrow may represent a "Reply" hotword. A forward-pointing triangle may represent a "Play" media file hotword. Such icons may be universally associated with particular actions associated with each hotword. Like the textual representations of hotwords, the graphical hotwords may include certain stylization or other features that indicate that the graphical elements are associated with hotword capabilities, and are not merely icons that can be selected by touchscreen input or a mouse pointer, for example. The repository 230 may store addresses or other references to graphical elements for the hotwords, or may store the actual image files for the graphical elements.

Some hotwords can be associated with multiple different representations in the representation repository 230. For example, hotwords table 104 from FIG. 1 shows separate English and Spanish representations for each hotword. Thus, depending on the language or geographic region associated with the request for a particular hotword, a different representation can be returned to the requesting application. Beyond respective representations for multiple languages, the repository 230 may include other or additional representations for all or particular ones of the hotwords. For example, hotwords may include entries for a textual representation, a graphical representation, and/or an audible representation. Representations of different sizes or styles may be included that can be selected to respond to a request based on a context associated with a request. For example, some of the representations may be default representations that are defined by a de factor or de jure standard for representing hotwords in electronic content. However, developers or users may specify alternate representations to be used other than the standard representations. For instance, the author of a webpage may specify in a stylesheet, for example, that hotword representations should be selected from a non-standard set of representations (e.g., graphical elements rather than textual representations, large graphical elements rather than small graphical elements, graphical elements with a certain color scheme, etc.). A user may also configure settings with the requesting application, such as browsing application 212, or in an account associated with the user, that indicates preferences for the types of hotword representations to be used. Accordingly, the representation repository 230 can include multiple representations for each of the hotwords that can be used to satisfy the respective parameters associated with each request for a hotword representation.

In some implementations, the list of hotwords and the information associated with each hotword in the representation repository 230 can correspond to a pre-defined list of hotwords. For example, the repository 230 may comply with a public voice interaction standard that defines a list of hotwords that devices or software that implement the voice interaction standard are capable of detecting. The standard may reserve a unique identifier value for each hotword in a set of hotwords included in the standard. The standard can also define one or more representations for each of the hotwords. Thus, content developers can include standard hotword identifiers in their content, and can rely on client devices executing the content according to the voice interaction standard to select an appropriate hotword representation. For example, the voice interaction standard may include 50-100 hotwords that are frequently used or that users are likely to encounter. The computing device 202 may include audio signatures for each of the hotwords in the standard that can be used to identify a particular hotword in the standard from spoken input. As such, content that includes an identifier of a hotword from the standard can be presented by the device 202 with a corresponding representation of the hotword, and the device 202 can perform one or more operations in response to receiving an indication of spoken input for the hotword. In some implementations, the hotword manager 214 may update the information in the representation repository 230 to stay current with updates to the voice interaction standard, for example, if new hotwords are added to the standard. In some implementations, information in the repository 230 may be expanded to include additional hotwords and/or additional hotword representations that are not defined by the voice interaction standard. For example, hotwords associated with websites visited by a user on the computing device 202 or applications installed on the computing device 202 may add additional hotwords. In some examples, the additional hotwords may use unique identifiers that are reserved on a public registry to prevent conflicts between the additional hotwords. In some examples, the additional hotwords may use unique identifier values that are reserved on a private registry on the computing device 202, which may vary across the different computing devices 202. The additional hotwords may be restricted to a certain range of identifier values outside of a range of values reserved for hotword identifiers included in the voice interaction standard. In some implementations, additional hotwords can be registered with the hotword manager 214 on the computing device 202, such as through an API, and the representation repository 230 can add information about the additional hotwords to its data, including information that identifies the application, web site, or other source that is associated with the additional hotword.

The representation repository 230 can also store metadata that indicates a context for particular hotwords or hotword representations. The metadata can be used by representation selector module 228 to identify the appropriate representation to return to a requesting application based on information in or associated with the request. Some examples of metadata include language, location, application preferences, user preferences, representation style, and representation type. Language can indicate, for each of multiple representations for a particular hotword, a respective language (e.g. English, Spanish, Mandarin, German) for the representation. Location can indicate geographic regions associated with the hotword representations. For example, depending on the location of the computing device 202 when the browsing application 212 requests a representation for a hotword, the particular representation selected can be determined based at least in part on the location of the computing device 202. In some examples, a language can be determined from the location, such as a language that is the primary spoken language at the location, and a representation in the determined language can be selected accordingly. The repository 230 can also maintain information about preferences that indicate which representations are to be returned to a requesting application. For example, a user may configure personal preferences for a language that overrides a default language or a language associated with the location of the computing device 202. Some preferences may be associated with a feature of the computing device 202. For example, large or small representations may be based on a display size, resolution, and/or zoom level of a webpage or application displayed on the computing device 202. The repository 230 can also store information that indicates a style associated with the hotword representations. For example, differently styled representations may be associated with a theme so that the hotword manager 214 can return hotwords to a requesting application that are consistent with a theme associated with a request. Representations in the repository 230 can also be classified by type (e.g., textual representation, graphical representation, or audible representation). Using type classifiers, the hotword manager 214 can return an appropriate type of representation in response to a request that matches a type associated with the request.

The hotword manager can also include a representation selector 228 that receives requests from request handler 226 and that retrieves hotword representations responsive to the requests from representation repository 230. In some implementations, representation selector 228 can lookup representations for one or more hotwords, from representation repository 230, that satisfy certain criteria or other context associated with a request. For instance, in processing a request from the browsing application 212, the request may include an identifier value for the requested hotword representation, and metadata that indicates criteria or other context associated with the request. For example, the browsing application 212 may include information that identifies the browsing application as being the source of the request, information that identifies the web site or webpage for which the hotword representation is to be included, information that indicates a style or type of the representation specified by the web site or the webpage, other information, or a combination of these. In some implementations, the representation selector 228 can cache or otherwise store metadata for use in selecting hotword representations. For example, the representation selector 228 may store metadata obtained from a request from a particular source, and may cache the metadata for subsequent use in handling requests from that source. In some implementations, the representation selector 228 may store information that can be used for processing requests that has determined independent of information specified in previous requests. For example, the representation selector 228 can include user preferences or device settings that affect which representations are to be returned in response to a request. These settings may be set automatically by the computing device 202 or may be pre-configured according to one or more options selected by a user. Based on the metadata or other information known to the representation selector 228, the representation selector can access the data within the representation repository 230 to select one or more representations that satisfy a request. For example, the browsing application 212 may request a hotword representation from hotword manager 214 for the hotword "Forward." The request may include the unique identifier value for the hotword (e.g., "3"), the language of the webpage that the representation is to be included in (e.g., English), and the type of representation requested (e.g., text). The representation selector 230 uses the information in the request to select the hotword representation "Forward." However, if the request indicated that the content of the webpage was written in Spanish, or if user preferences had indicated that Spanish was the user's default language, the representation selector 230 could access the corresponding Spanish entry for the hotword and return the representation "Reenviar."

The computing device 202 can also include browsing application 212 and other applications that obtain hotword representations from the hotword manager 214. In some implementations, the hotword manager 214 may serve multiple applications, or it may be dedicated to a particular application such as the browsing application 212. Generally, the applications that obtain hotword representations from the hotword manager 214 are configured to provide hotword capabilities by performing one or more operations when a hotword is detected as having been spoken by a user. To indicate that certain hotword operations are enabled, the applications can display hotword representations that specify hotwords the application is programmed to respond to. For example, an e-mail application may respond to terms or phrases like "New Message," "Open Address Book," "Forward," and "Reply," and the browsing application 212 may respond to terms or phrases defined by a webpage such as "Share" to share the page on a social media system, and "Play" to begin playing an embedded media file, and "Go" to direct the browser to a target location specified, for example, by a hyperlink. The code for the content that is displayed by the browsing application 212, or by another application, specifies which, if any, hotwords are to be enabled by including hotword indicators in the code. The hotword indicators generally include a unique identifier value that specifies the particular hotword that is to be enabled, and may include other attributes that instruct the application how the hotword is to be processed. However, in some implementations, the hotword indicators may not directly specify a representation for the hotword that is to be displayed by the computing device 202. Instead, the representations may be retrieved by the application from a hotword manager 214.

One advantage of obtaining hotword representations from the hotword manager 214 is that the representations, or a style of the representations that may be obtained from the hotword manager 214, may comport with standards for a voice interaction framework. Thus, as many users and many computing devices implement the standardized voice interaction framework, hotword representations can become familiar and recognized. For example, text or graphical elements that are stylized according to a standard may signify that the text or graphical element represents a hotword. Standardized hotword representations and/or standardized stylizations may become recognizable so that users are readily made aware of hotword-enabled content. Moreover, by inserting hotword identifiers in code rather than actual hotword representations that are to be displayed, the computing device 202 executing the code can select an appropriate representation based on a number of factors. For example, if a user has disabled hotword detection, then representations may be obtained from the hotword manager 214 that indicate the hotwords are not enabled. Likewise, an appropriate style, type, or language of a hotword representation can be selected based on user preferences, device settings, attributes associated with a hotword identifier, and other factors. For example, the computing device 202 may be configured to detect and respond only to Spanish-spoken hotwords. Accordingly, the hotword manager 214 may obtain Spanish hotword representations that are consistent with the language configuration of the computing device 202.

The browsing application 212 can include various components that facilitate implementation of a voice interaction framework using hotwords. In some implementations, the browsing application 212 can include a parsing engine 218, a display manager 220, a hotwords integration engine 222, and a hotwords conflicts manager 224.

The parsing engine 218 is configured to receive web code for a webpage and to parse the code into an intermediate representation from which a display of the webpage may be generated. For example, the browsing application 212 may receive web code, such as HTML, JavaScript, and CSS, for a webpage. The parsing engine 218 can parse the HTML into an intermediate representation such as a Document Object Model ("DOM"). The JavaScript may be parsed into abstract syntax trees ("ASTs") for example. These intermediate representations can then be used by the display manager 220 to generate a display of the webpage.

The parsing engine 218 can also identify hotword indicators that have been included in the web code. A hotword indicator is a code element that specifies a hotword that is to be included in electronic content. The presence of a hotword indicator can cause the computing device 202 to activate hotword detection capabilities in conjunction with execution of the electronic content. The hotword indicator can include one or more attributes that specify parameters for the hotword. The attributes may include a hotword identifier, operations to be performed in response to detecting the hotword from spoken input, a page identifier, representation parameters, or a combination of these. For example, the parsing engine 218 can be configured to recognize an anchor tag as a hotword indicator. Thus, when the parsing engine 218 identifies the anchor tag in the following example portion of an HTML document, the browsing application 212 can recognize the anchor tag as a hotword indicator: "Say <a:hotword hotword="reply"></a> to e-mail Ned." Based on the hotword indicator, the computing device 202 can enable hotword detection for "Reply," and the browsing application 212 can insert a representation for the "Reply" hotword, which may be obtained from hotword manager 214, into a display of the webpage between the words "Say" and "to e-mail Ned." In some implementations, other tags can be used that are designated for hotword indications, such as a <hotword> tag. In another example, based on the hotwords table 104 shown in FIG. 1, a hotwords indicator may include certain attributes: <hotword id="reply" hotwords_id="4" language="English">. The id attribute with a value of "reply" can be used to reference the hotword by other elements in the webpage. For example, a JavaScript function associated with the webpage may be called when the "Reply" hotword is detected. The value of the id attribute can be used by the JavaScript function to identify the particular hotword element that triggers execution of the JavaScript function. The hotword_id attribute specifies a unique hotword identifier value. The hotword identifier value can indicate which of a plurality of pre-defined hotwords that the hotword indicator tag corresponds to (e.g., "Open," "Reply," "Forward," etc.). The hotword identifier value can be included in a request from the browsing application 212 to the hotword manager 214 to obtain a representation of the hotword for inclusion in the display of the webpage. The hotword identifier value can also be passed to the hotword detector 216 to instruct the hotword detector to monitor spoken input for the particular hotword corresponding to the identifier value. For example, based on the identifier value of "4" from the <hotword> tag, the hotword manager 214 can select a hotword representation such as "Reply," and the hotword detector 216 can monitor an incoming audio stream to detect when the word "Reply" is spoken.

The hotwords integration engine 222 facilitates inserting hotword representations into a webpage or other application content. The hotwords integration engine 222 can receive information about hotwords included in web code for a webpage from the parsing engine 2118 in some implementations. The hotwords integration engine uses the information from the parsing engine 118 to format and send requests for corresponding hotword representations to the hotword manager 214. For example, the hotwords integration engine may send a request for a hotword representation that includes the unique hotword identifier value, a preferred style (e.g. colors, formatting), a preferred type (e.g., text, graphical element, audio), a preferred language for the representation, and any other metadata that may be used by the hotword manager 214 to identify and return an appropriate hotword representation. The hotwords integration engine 222 can return information regarding representations obtained from the hotword manager 214 to the parsing engine 218. The parsing engine 218 can then incorporate the representations into the page's DOM, for example, to be displayed in the presentation of the webpage by the computing device 202.

The display manager 220 uses the intermediate representation of a webpage from the parsing engine 218 to generate a display of the webpage. On a mobile device, such as a smartphone or a tablet computing device, the display manager 220 may generate a display of the webpage on a touch sensitive electronic display of the computing device 202. The displayed webpage can include one or more hotword representations that indicate to a user that certain hotwords are enabled on the webpage. The location of the hotword representations in the webpage can correspond to a location of the hotword indicators within the HTML or other web code in some implementations. For example, if a hotword indicator is included between <td> and </td> tags in an HTML document, the hotword representation can be displayed in a region of the webpage that holds the content between the <td> and </td> tags.

In some implementations, the display manager 220 can format hotword representations in the webpage distinctively from other content in the webpage to indicate that the hotword representations are associated with hotword capabilities on the computing device 202. For example, textual hotword representations may be formatted with a particular font color, font face, or a font type (e.g., bold, italics, underlined, highlighted). In some implementations, the display manager 220 may obtain styling or formatting rules for the representations from hotword manager 214. In some implementations, display manager 220 can apply default styling or formatting rules that have been pre-defined by the browsing application 212, and in some implementations, the browsing application 212 can apply styling or formatting rules to the hotword representations based on styles specified in the webpage code (e.g. stylesheets). In some implementations, the display manager 220 can a graphical element, such as an icon, in conjunction with each hotword representation that signifies that the hotword representation is associated with hotword capabilities on the computing device 202.

The browsing application 212 can also include a hotwords conflicts manager 224. In some implementations, the hotwords conflicts manager 224 can determine when to activate and deactivate one or more hotwords on a webpage. In some implementations, the hotwords conflicts manager 224 can determine which operations to perform in response to detecting that a user has spoken a hotword included in the webpage. The hotwords conflicts manager 224 can make these determinations, in some examples, based on a hotwords conflicts management policy. In some implementations, the hotwords conflicts management policy may have default settings, which may be changed by a user of the computing device 202, or which may be configured based on one or more parameters specified in the web code for the webpage.

In some implementations, the hotwords conflicts manager 224 can activate or deactivate hotword detection based on the user's interaction with the webpage. For example, the conflicts manager 224 may only activate hotword detection and/or response capabilities for a first hotword in a webpage when the webpage is in focus on a display of the computing device and/or when the user is currently or has recently interacted with the webpage. Thus, if the browsing application 212 is open, but the user is interacting with a different application, or the user is interacting with a different webpage (e.g., in another tab of the browsing application 212), the conflicts manager 224 may instruct the hotword detector 216 to stop listening for spoken input for the first hotword. Similarly, the hotwords conflicts manager 224 may only activate hotword capabilities (e.g., detection and/or response operations) for the first hotword when a representation for the first hotword is in focus on a display of the computing device. For example, the full presentation of the webpage that includes the first hotword may be larger than a display area for the webpage on an electronic display of the computing device 202, requiring the webpage to be scrolled to view different portions of the webpage. The conflicts manager 224 may deactivate the first hotword such that no operations are performed by the computing device responsive to the user speaking the first hotword. When the representation for the first hotword is brought into view in the display of the webpage, the conflicts manager 224 can activate the first hotword by causing the computing device 202 to monitor spoken input for the first hotword and to perform a set of operations associated with the first hotword when the first hotword is detected from the spoken input.

In some implementations, the conflicts manager 224 can arbitrate conflicts between multiple hotwords in a webpage. For instance, the conflicts manager 224 can determine which, if any, operations to perform when a hotword is detected from spoken input and the webpage includes multiple instances of the hotword. For example, a webpage may include multiple embedded media files and each of the multiple media files can be hotword enabled. Thus, the webpage may be configured to allow the user to speak hotword commands such as "Play," "Pause," and "Stop" to control playback of any of the media files. The conflicts manager 224 can apply rules from the conflicts management policy to determine which operations to perform upon detecting one of the hotwords. In the above example, the conflicts manager 224 can determine, for instance, which of the media files to play, pause, or stop when a corresponding hotword is received from spoken input. In some implementations, the conflicts manager 224 can perform operations associated with a first instance of a hotword that has a representation in focus on a display of the computing device 202, and not perform operations with a second instance of a hotword that is not in focus or that is outside a displayed portion of the webpage. For example, if a first one of the embedded media files and its corresponding hotword representation(s) are displayed in a window of the browsing application 212 when the "Play" hotword is detected, the conflicts manager 224 can permit the first media file to be played to the exclusion of the other media files that are not currently displayed. In some implementations, a priority order may be determined among each instance of a hotword, and the conflicts manager 224 may permit performance of operations associated with each instance of the hotword according to the priority order. In some implementations, the conflicts manager 224 may permit performance of operations associated with all or none of multiple instance of a hotword included in a webpage or other application content.

The computing device 202 can also include a hotword detector 216. Generally, the hotword detector 216 is configured to monitor an audio stream of the computing device and to detect when a hotword has been spoken by a user of the device 202. The hotword detector 216 can notify the browsing application 212, the hotword manager 214, or both when a hotword has been detected from spoken input. In some implementations, the hotword detector 216 may detect and/or report only active hotwords (e.g., hotwords included in a displayed webpage that are associated with one or more operations). In some implementations, the hotword detector 216 may detect and/or report a plurality of hotwords regardless of whether the hotwords are included in the webpage or whether the hotwords are active. For example, the hotword detector 216 may continuously be listening for a complete or partial set of hotwords defined on a device 202, and the hotword detector 216 may report detection of any of these hotwords. If the webpage does not include a reported hotword, or if the webpage includes the hotword but the hotword is inactive, then the browsing application 212 may discard the detection report from the hotword detector 216. In some implementations, the hotword detector 216 may be hosted by a remote computing system such as at speech server 206. In some implementations, the hotword detector 216 may be installed on the computing device 202.

The hotword detector 216 can include a detection engine 232, an active listening module 234, a signature bank 236, and an identifier repository 238. The signature bank 236 can include respective signatures that correspond to a plurality of hotwords. A hotword signature is data that characterizes an audio pattern for a hotword and that can be used to detect when the hotword has been spoken in an audio stream processed by the computing device 202. The signature bank 236 can include one or more hotword signatures for each of a plurality of hotwords that are defined on the computing device 202. For example, the computing device 202 may maintain a hotword registry that includes a list of hotwords that the computing device 202 is capable of recognizing. The signature bank 236 can include signatures for each of the registered hotwords. In some implementations, a hotword may have multiple signatures in the signature bank 236 that correspond, for example, to different languages. The active listening module 234 monitors an audio input stream for the computing device 202. The detection engine 232 analyzes the audio input stream and compares the stream against hotword signatures from the signature bank 236. When a portion of the audio input stream is determined to match a hotword signature within a defined tolerance, the detection engine 232 prepares a notification to report to the browsing application 212 and/or the hotword manager 214 regarding the detected hotword. The detection engine 232 can access the identifier repository 238, in some examples, to lookup the unique identifier value for the detected hotword, or to lookup other data that identifies the hotword. The detection engine 232 can send the unique identifier value or other data that identifies the detected hotword to the browsing application 212 or to the hotword manager 214 in the notification report.

In some implementations, a framework can be provided that allows application developers to easily add voice interaction capabilities, such as hotword detection, to computer applications 212. For example, developers may use the framework to incorporate voice interaction capabilities into games, productivity software, messaging applications, internet applications, or any other applications 212 that utilize the framework. The framework can be associated with an operating system 213, such as an operating system 213 for mobile devices, that provides various services or resources to an application 212. For example, the application 212 may call particular services or resources from an operating system 213 using a defined application programming interface ("API"). The framework may provide libraries of classes and methods, for example, which the application 212 can utilize to implement particular operating system 213 services or resources. In some examples, either or both of the hotword manager 214 and the hotword detector 216 may be operating system services within the framework that are made available to the application 212. The framework can thus provide a platform for rendering visual representations of hotwords in an application 212 and for detecting hotwords from spoken input. Moreover, although the framework can provide hotword rendering and detection capabilities for an application 212, the framework may also allow developers to specify one or more responsive operations to be performed when certain hotwords are detected from spoken input. Therefore, developers may retain control of what happens when a hotword is detected.

In some implementations, developers can include one or more hotword indicators in program code for an application 212. The hotword indicators can be recognized within the framework as being directed to adding hotword detection capabilities to an application 212. When the application is executed by a computing device, the application 212 can include visual representations of hotwords, and the device can listen for hotwords, based on information specified by the hotword indicators. For example, the hotword manager 214 can identify suitable hotword visual representations to be rendered in a display of the application 212, and the hotword detector 216 can listen for and recognize corresponding hotwords from spoken input that have been specified by the hotword indicators in the program code.

An application 212 can be defined by program code that includes a layout declaration and other code. The layout declaration identifies elements that are to be included in one or more display areas of the application 212. The layout declaration can also specify an arrangement or layout of the display areas. In one example, the layout declaration for a particular application 212 may define the layout of an application screen for user authentication. In this example, the layout declaration may include two input field elements for receiving a user's username and password, respectively. The layout declaration may also include code for an image element and a button element that users can click to log-in to the application. The layout declaration may be a structured markup language document, such as XML, that includes tags corresponding to each of the elements that are to be displayed on the application screen. The arrangement of the tags in the layout declaration, along with attributes associated with the tags (e.g., element sizes, colors, locations, etc.), can be interpreted by a rendering engine that is configured to operate within the framework to generate a display of the application screen specified by the layout declaration. For example, the layout declaration can indicate how the input field elements, graphical element, and button element are to be arranged and displayed relative to each other.

The application 212 can also include other code, in addition to the layout declaration, that brings functionality to the application 212. The other code can include functions, methods, routines, or other sets of instructions that indicate certain operations for the computing device to perform when the user interacts with the application or particular elements within the application 212. For example, when the user selects the button element, the other code can define a function to be performed, such as a log-in operation, in response to selection of the button. In some implementations, the application 212 can use a callback mechanism to identify what operations are to be performed in response to certain events. For example, the markup tags in an XML layout declaration may include attributes that identify a particular function or operations to be performed upon the occurrence of a specified event. In some implementations, the framework can provide listeners that alert the application 212 to certain events such as touchscreen input, spoken input or other detected audio, or that a user has made a selection or clicked a button, for example, so that a callback can be made to perform a certain function. Accordingly, the framework can bridge a layout declaration with other code for an application 212, and can provide capabilities such as event listeners to the application 212, which together may ease the burdens of application development.

Within such a framework as has been described, hotwords and other voice interaction capabilities may be implemented. For example, developers may include hotword tags or other hotword indicators in a layout declaration for an application 212. The hotword tags may include one or more attributes or other parameters that indicate, for example, an identifier for a particular hotword and responsive operations to be performed when the hotword is detected. A hotword tag may also indicate other information such as a relative priority between it and other hotwords on the application screen for managing conflicts between hotwords; whether the hotword is to be active when a visual representation of the hotword is out of focus; a language for the hotword; and display properties for the visual representation of the hotword such as size, font, location, and stylization.

The inclusion of the hotword tag in the application's 212 layout declaration can be sufficient to incorporate a hotword into the application 212. For example, a hotword tag in the layout declaration for an application may cause an instance of a hotword class provided within the framework to be created according to the attributes or other parameters specified in the tag. The hotword class may reference or include the functions of the hotword manager 214 and/or the hotword detector 216 in some examples. The developer need not specify a particular visual representation of the hotword, how the visual representation is to be rendered, or code for listening for and detecting the hotword. Instead, the framework may provide these capabilities based on the inclusion of the hotword tag in the layout declaration. The framework can use the identifier for a particular hotword specified in the layout declaration to obtain a visual representation for the hotword, for example, from a hotword manager 214 that stores information correlating hotword identifiers with hotword representations. In this way, visual representations of hotwords may be presented in an application 212 with a uniform display feature, for example, that indicates to a user that the user may interact with the application 212 by speaking certain hotwords. Moreover, the hotword identifiers may be provided to a hotword detector 216 that listens for any of the hotwords in the layout declaration from spoken input, and that can alert the application 212 when a hotword has been detected. In some examples, upon receiving the alert, the application 212 calls responsive operations from application code outside of the layout declaration to be performed in response to the spoken hotword.

Figure 3:
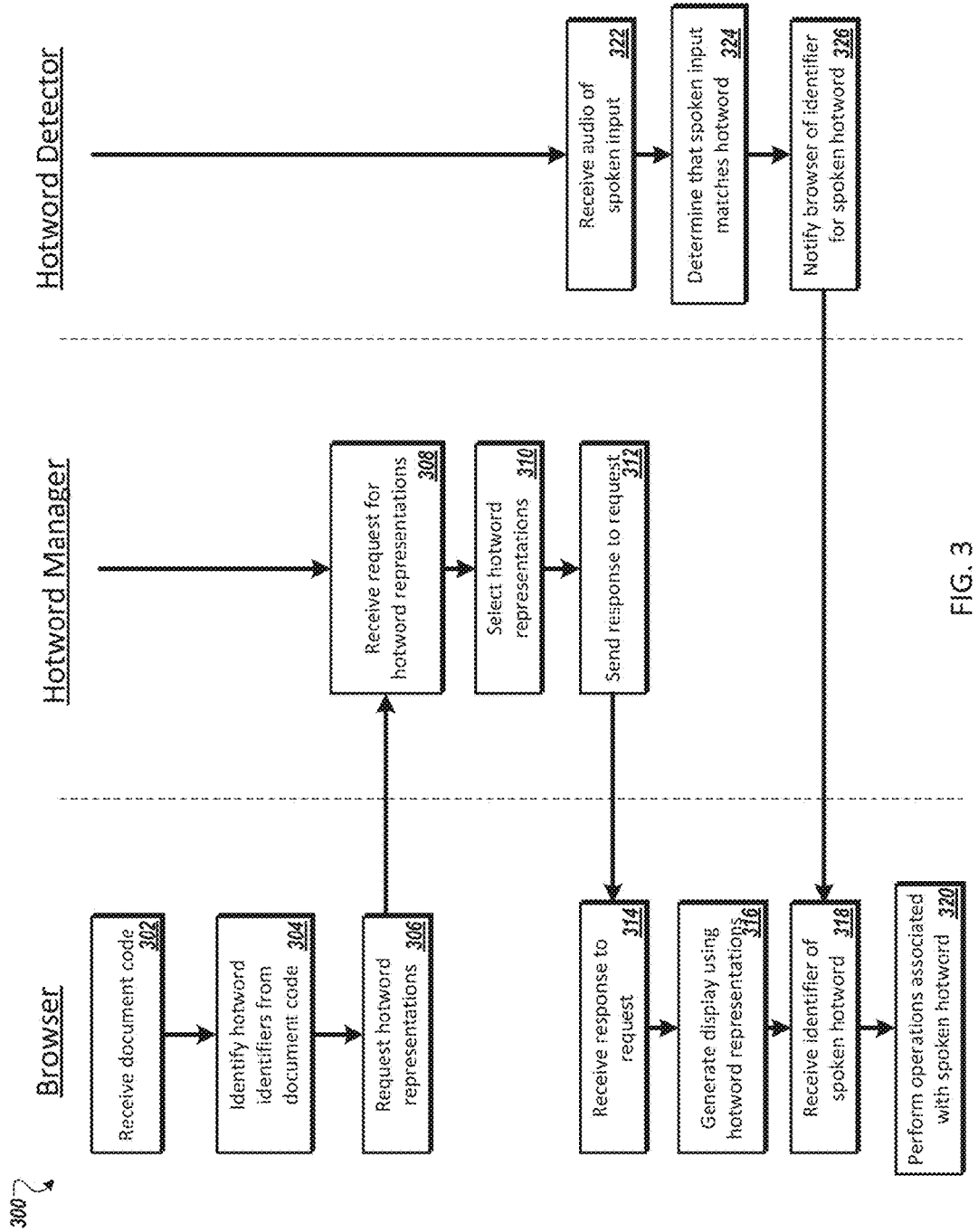
FIG. 3 is a swim-lane diagram of an example process for incorporating hotwords into a webpage.

FIG. 3 is a swim-lane diagram of an example process 300 for incorporating hotwords into a webpage. In some examples, the process 300 may be implemented by the system 100 described with respect to FIG. 1. In some examples, the process 300 may be implemented by the system 200 described with respect to FIG. 2A, including with various configurations of the computing device 212 such as the examples shown in FIGS. 2A, 2B, and 2C. Generally, the swim-lane diagram shows example interactions between a browser, a hotword manager, and a hotword detector. In some implementations, the browser, the hotword manager, and the hotword detector can be configured as, and can perform the operations of, the components of like name in system 100 and system 200.

At stage 302, the browser receives code for a document. In some examples, the document can be a webpage, and the code for the document can be HTML and related code that define the structure, style, and functionality of the webpage. The document code can include one or more hotword indicators, such as HTML tags, that specify hotwords that are to be included in the presentation of the webpage so that users can interact with the webpage by speaking particular ones of the included hotwords.

At stage 304, the browser can determine hotword identifiers from the document code. The hotword identifiers may be specified, for example, in the HTML tags or other hotword indicators in the code. The hotword identifiers can indicate which hotwords are to be included in the webpage from among a set of pre-defined hotwords that each have a unique hotword identifier.

At stage 308, the browser requests, from the hotword manager, representations for each of the hotwords identified from the document code. The browser's request can include the unique hotword identifiers that have been scraped from the document code, along with any classifiers that indicate a particular context or criteria associated with the request. For example, if a user who views the webpage has configured his hotwords settings to use French hotwords, then the request may include a language classifier that indicates a French hotword representation is required or preferred.

At stage 310, the hotword manager selects hotword representations that satisfy the request. The representations can be identified from a database, lookup table, or other repository of hotword data that includes information that correlates, for each of a plurality of hotwords, an identifier for the hotword and one or more representations for the hotword. At stage 312, the hotword manager returns the selected hotword representations to the browser, which are received by the browser at stage 314.

At stage 316, the browser generates a display of the webpage using the hotword representations obtained from the hotword manager. For example, the browser can insert the representations for the hotwords at locations that correspond to locations of the hotword indicators (e.g., hotword HTML tags) in the document code. The hotword representations may include text, audio, graphical elements, or a combination of these.

Once the browser has begun executing the webpage and has generated a display of the webpage that includes one or more hotword representations, the hotword detector can begin to monitor spoken input to detect when one of the hotwords included in the webpage is spoken. At stage 322, the hotword detector receives audio of spoken input. At stage 324, the hotword detector analyzes the spoken input and determines that the spoken input matches one of the hotwords included in the webpage. At stage 326, the hotword detector can send a message to the browser that indicates that a hotword has been detected from spoken input. The message to the browser may identify the detected hotword by the unique identification value for the detected hotword.

At stage 318, the browser receives the notification from the hotword detector that identifies the hotword that has been detected from spoken input. The browser then identifies responsive operations that are associated with the detected hotword, and at stage 320, performs the operations associated with the detected hotword.

Figure 4:
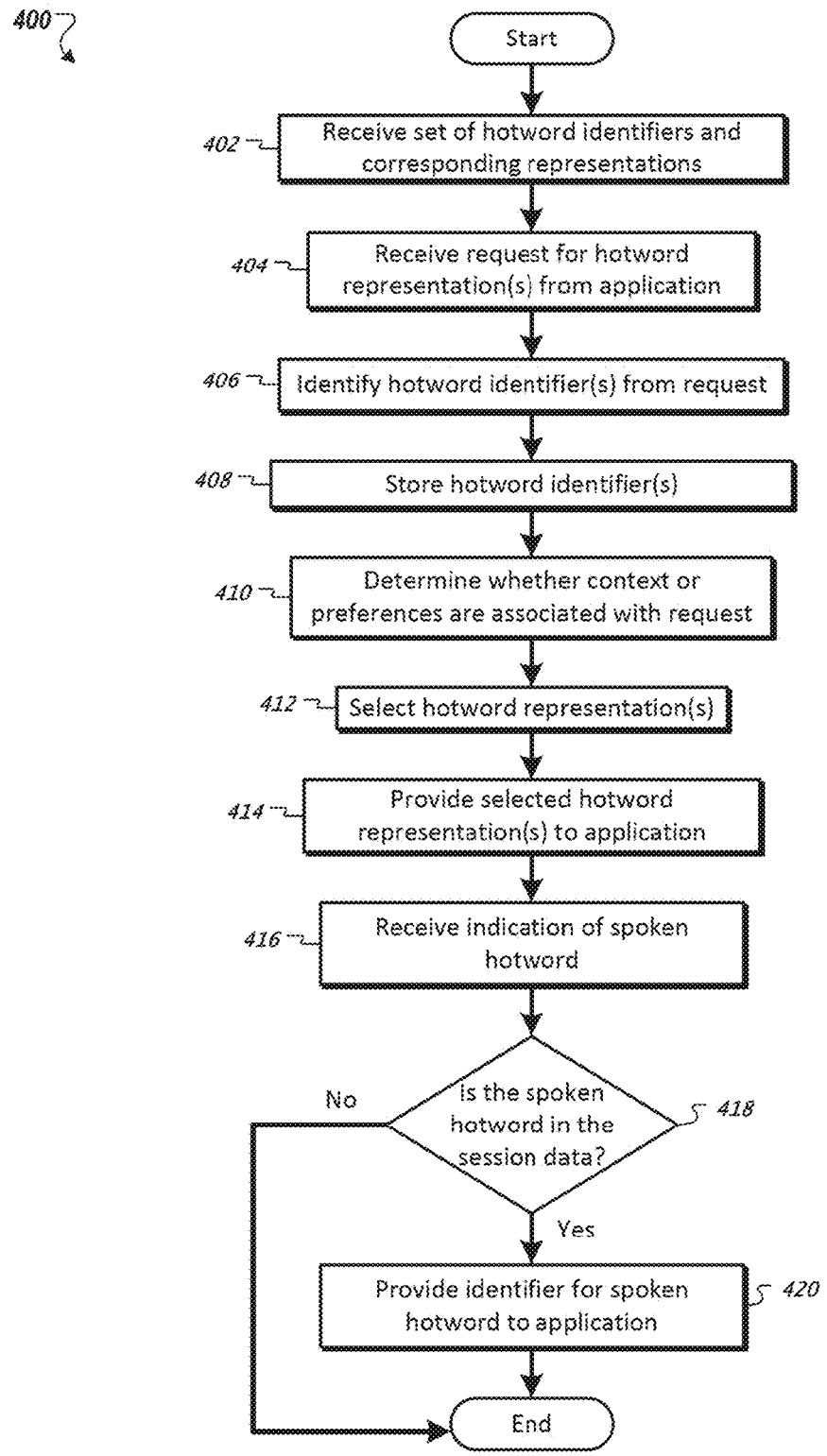
FIG. 4 is a flowchart of an example process by which a hotword manager can identify one or more representations of hotwords to provide to an application.

FIG. 4 is a flowchart of an example process 400 by which a hotword manager can identify one or more representations of hotwords to provide to an application. In some examples, the process 300 may be implemented by the system 100 described with respect to FIG. 1. In some examples, the process 300 may be implemented by the system 200 described with respect to FIGS. 2A, 2B, and 2C.

At stage 402, the hotword manager can receive data for a set of hotword identifiers and corresponding representations for the hotwords. The received data can be received in batch or may be received over a period of time, for example, if new hotwords are registered with the hotword manager at different times. The data can be organized and stored in a database, table, or other data structure(s) that allow hotword representations to be identified from a corresponding hotword identifier value.

At stage 404, the hotword manager can receive a request for one or more hotword representations from an application. In some examples, the application may be a web browsing application. At stage 406, the hotword manager identifies hotword identifier(s) from the request.

At stage 408, the hotword manager can store the hotword identifiers from the request in session data. Later, the stored identifiers can be used to filter detection messages from a hotword detector so that only hotwords detected from spoken input that are included in the session data are sent to the application that requested the hotword representations. For example, the hotword detector may send detection messages to the hotword manager for a full set of hotwords that it is capable of detecting. The hotword manager can then reference the session data to determine whether to report the detection messages to the requesting application based on whether or not an identifier of the detected hotword is included among the stored identifiers in the session data.

At stage 410, the hotword manager determines whether context or preferences are associated with the request. For example, the request from the application may specify a language or other criteria for the representations that are to be displayed by the application. At stage 412, the hotword manager can use the hotword identifiers and any context or preferences associated with the request to select appropriate hotword representation(s) responsive to the request. At stage 414, the hotword manager can provide the selected hotword representation(s) to the application that sent the request.

At stage 416, the hotword manager receives an indication that a hotword has been detected from spoken input. The indication may be provided by a hotword detector running on a common device as the hotword manager and the application. At stage 418, the hotword manager determines whether the spoken hotword that was detected by the hotword detector is included in the session data for the application that requested the hotword representations. If so, the hotword manager provides an identifier for the detected hotword, or other information that indicates the detected hotword was spoken, to the application at stage 420. If the detected hotword is not identified from the session data, then the hotword manager does not send a notification to the application that a hotword was detected.

Figure 5:
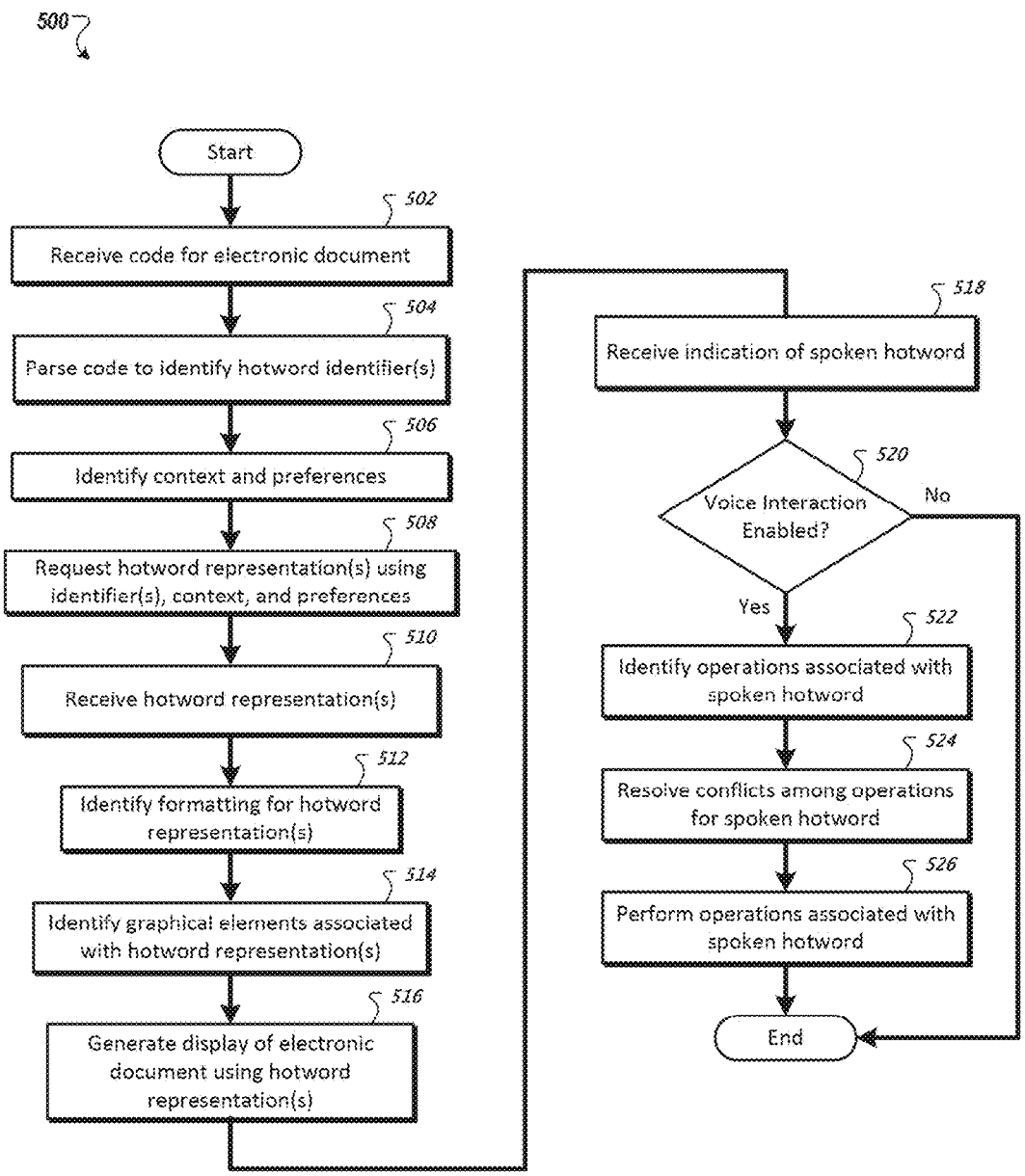
FIG. 5 is a flowchart of an example process by which a web browsing application can incorporate hotwords in a webpage.

FIG. 5 is a flowchart of an example process 500 by which a web browsing application ("browser") can incorporate hotwords in a webpage. In some examples, the process 300 may be implemented by the system 100 described with respect to FIG. 1. In some examples, the process 300 may be implemented by the system 200 described with respect to FIGS. 2A, 2B, and 2C.

At stage 502, the browser receives code for an electronic document. For example, the code may be HTML and other forms of web code for a webpage. At stage 504, the browser parses the code to identify whether any hotwords are included in the code. If any hotwords are included, the browser determines an identifier for the hotwords. In some examples, the hotword identifiers can be specified in HTML tags that the browser recognizes as incorporating hotwords into the webpage. At stage 506, the browser identifies any context, preferences, or other criteria for representations of the identified hotwords that the browser will display in the webpage. At stage 508, the browser sends a request for representations of any identified hotwords in the webpage to a hotword manager that maintains information about hotwords and visual representations of the hotwords. The request can include the identifiers for the hotwords and any identified context, preferences, or other criteria for the representations.

At stage 510, the browser receives the representations for the hotwords from the hotword manager that have been identified as being responsive to the request. The representations for the hotwords can be included in a display of the webpage that will be generated by the browser. In some implementations, the browser can apply pre-defined formatting or other stylization to the hotword representations in the display so that the hotword representations are visually distinct from other content displayed in the webpage. At stage 512, the browser identifies the formatting to apply. The browser may apply default formatting rules based on an accepted standard for formatting hotword representations. In some implementations, the formatting rules may be specified in style sheets associated with the website that modify all or certain ones of the default formatting rules. In some implementations, the browser may apply custom formatting rules to the hotword representations that a user has defined. In some implementations, formatting rules or visual themes may be maintained by the hotword manager. The webpage code may identify a particular theme, for example, and the browser can retrieve the rules for the theme by requesting the rules from the hotword manager. Some examples of formatting include applying a uniform font color, font face, font style (e.g., bold, underline, italics), and other visual distinctions.

At stage 514, the browser can identify graphical elements that can be displayed with the hotword representations. The graphical elements can be displayed in conjunction with the hotword representations to indicate to users that the hotword representations are associated with voice interaction capabilities (e.g., hotword detection). For example, a static or dynamic icon or border may be displayed near each hotword representation (e.g., a microphone icon). In some implementations, the graphical elements may be superimposed over the hotword representations, or may be displayed behind the representations or to the side of the representations. In some implementations, the graphical elements can be obtained from the hotword manager. In some implementations, the graphical elements can be displayed with the hotword representations as the only visual distinguishing feature associated with the hotword representations. For example, the browser may display a microphone icon with each hotword representation in the webpage without specially formatting the text of the hotword representations. In some implementations, the browser may apply both pre-defined formatting or stylization rules to the hotword representations while also displaying respective graphical elements with each hotword representation.

At stage 518, the browser can receive an indication of a spoken hotword. The indication can be received from a hotword detector, for example, that has provided the indication in response to detecting that one of the hotwords in the webpage has been spoken.

At stage 520, the browser determines whether voice interaction services are enabled. For example, the user may disable hotword detection and other voice services, and if so, the computing device running the browser may not detect hotwords or perform operations in response to detecting hotwords. If voice interaction services are enabled, the process 500 proceeds to stage 522.

At stage 522, the browser identifies one or more operations associated with the spoken hotword. In some implementations, the webpage may include multiple instances of the same hotword. Each instance of the hotword may be associated with the same or different responsive operations. When the operations associated with each instance of the hotword are different, a conflict exists regarding which operations, if any, to perform. At stage 524, the browser can resolve the conflict and apply one or more rules to determine which operations to perform. For example, each hotword and each instance of a hotword that appears more than once in a webpage may be ranked according to a priority score. The browser may then perform the operations associated with the highest ranked instance of the hotword rather than any lower ranked hotwords. In some implementations, the browser may perform the operations of each instance of the common hotword in sequence based on the ranking of the priority scores. In some implementations, absolute or relative priorities among all or some of the hotwords in the webpage can be specified in the webpage code. For example, one attribute of the hotword tags in the HTML code can indicate the hotword's priority. In some implementations, the browser may infer a priority, for example, based on a location of the hotword representation in the webpage or which instance of a hotword is in focus by a user interacting with the webpage. In some implementations, the browser may perform all or none of the operations for the conflicting hotwords. At stage 526, the browser can perform the operations associated with a spoken hotword.

Figure 6:
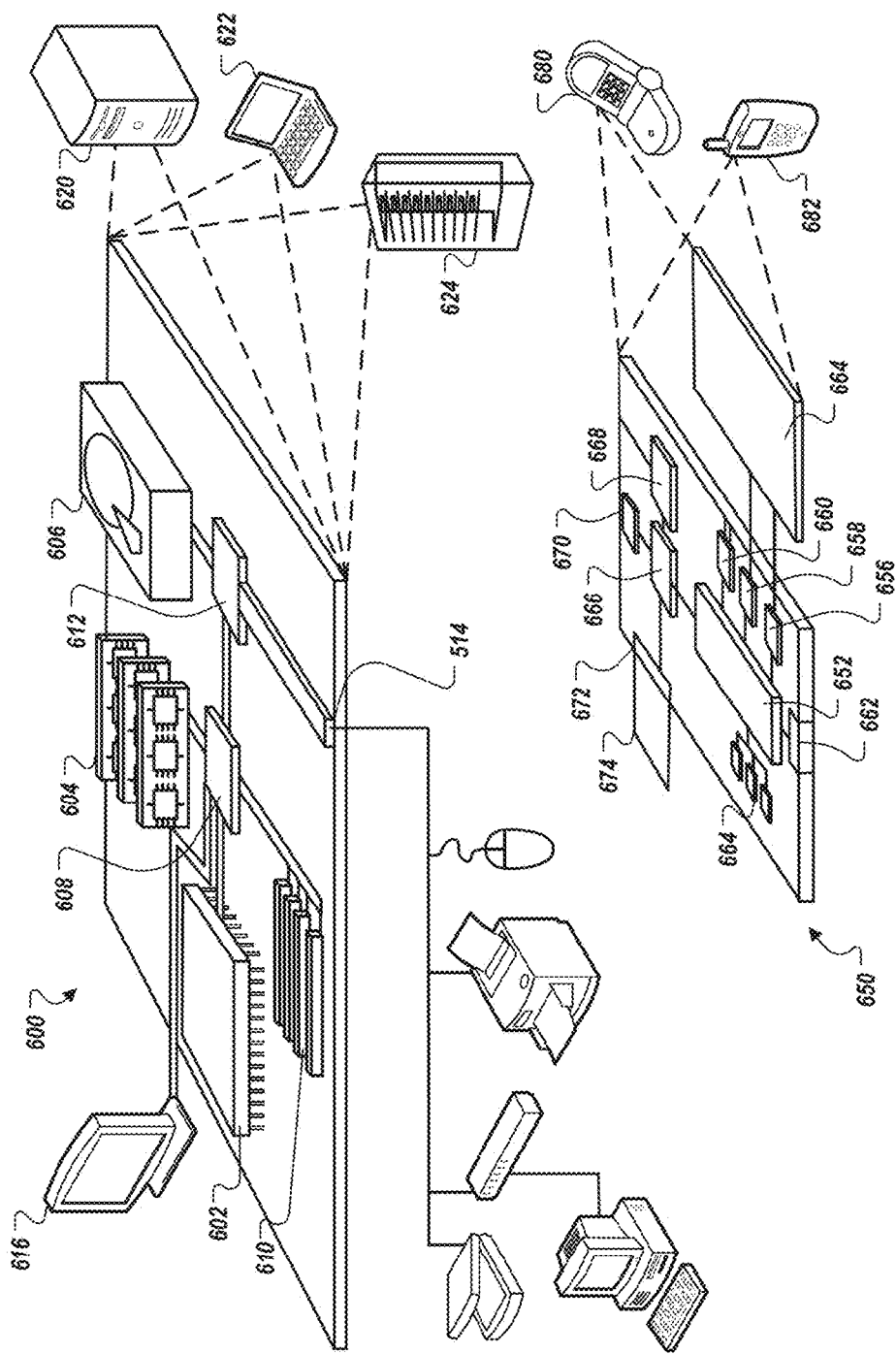
FIG. 6 shows an example of a computing device and a mobile computing device that can be used to implement the techniques described herein.

FIG. 6 shows an example of a computing device 600 and a mobile computing device that can be used to implement the techniques described herein. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A computer system comprising:
  one or more computing devices;
  a hotword manager, on the one or more computing devices, configured to maintain, for each hotword of a plurality of hotwords, information that maps a unique identifier of the hotword to a visual representation of the hotword, wherein the visual representation of a first hotword of the plurality of hotwords is visually different from the visual representation of a second hotword of the plurality of hotwords;
  a hotword detection module, on the one or more computing devices, configured to listen for spoken input and to detect instances of spoken input that correspond to particular ones of the plurality of hotwords; and
  a browsing application, on the one or more computing devices, configured to:
    (i) receive code for an electronic document, the code including a hotword instruction that is dedicated to activating, in a presentation of the electronic document, a hotword detection capability for a particular hotword of the plurality of hotwords identified by the hotword instruction,
    (ii) identify the hotword instruction in the code for the electronic document,

(iii) generate the presentation of the electronic document, including as a result of the hotword instruction identifying the particular hotword in the code for the electronic document:
   (a) activating the hotword detection capability for the particular hotword including enabling the computer system to respond to instances of spoken input that correspond to the particular hotword, and
   (b) selecting the visual representation of the particular hotword for display in the presentation of the electronic document, so as to indicate that the computer system is configured to respond to instances of spoken input that correspond to the particular hotword, wherein the browsing application obtains the visual representation of the particular hotword from the hotword manager using the unique identifier of the particular hotword, and
   (iv) perform, in response to identifying spoken input that corresponds to the particular hotword during presentation of the electronic document, a set of operations assigned to the particular hotword.

2. The computer system of claim 1, wherein the hotword manager is further configured to receive a request from the browsing application that includes the unique identifier for the particular hotword that is identified by the hotword instruction, and to respond to the request with the respective visual representation for the particular hotword.

3. The computer system of claim 1, wherein the hotword detection module is further configured to notify at least one of the hotword manager or the browsing application in response to detecting spoken input that corresponds to one of the plurality of hotwords.

4. The computer system of claim 1, wherein the visual representation for the particular hotword comprises text of one or more terms for the particular hotword, and wherein the browsing application is further configured to generate the presentation of the electronic document by inserting into the presentation of the electronic document text of one or more terms that correspond to the particular hotword that is identified by the hotword instruction.

5. The computer system of claim 1, wherein the visual representation for the particular hotword comprises a graphical element, and wherein the browsing application is configured to generate the presentation of the electronic document by inserting into the presentation of the electronic document a graphical element that corresponds to the particular hotword that is identified by the hotword instruction.

6. The computer system of claim 1, wherein the hotword manager is further configured to maintain multiple visual representations for the particular hotword that is identified by the hotword instruction and to select one of the multiple representations to provide to the browsing application for presentation within the presentation of the electronic document based on a location or a language associated with the one or more computing devices or a user of the one or more computing devices.

7. The computer system of claim 1, wherein the electronic document is a webpage and the hotword instruction is a hypertext markup language (HTML) tag in HTML code for the webpage.

8. The computer system of claim 1, wherein at least one of the hotword manager or the hotword detection module is a component of the browsing application.

9. The computer system of claim 1, wherein at least one of the hotword manager or the hotword detection module is a component of an operating system of the one or more computing devices.

10. The computer system of claim 1, wherein the browsing application is configured to visually distinguish the visual representation of the particular hotword in the presentation of the electronic document from other content shown in the presentation of the electronic document.

11. The computer system of claim 10, wherein the browsing application is configured to present a common graphical element with the visual representation of the particular hotword in the presentation of the electronic document, the common graphical element indicating that voice operations are associated with the visual representation of the particular hotword.

12. The computer system of claim 11, further comprising a conflicts manager, on the one or more computing devices, configured to select, in response to identifying the spoken input that corresponds to the particular hotword during presentation of the electronic document, the particular set of operations assigned to the particular hotword from among multiple sets of operations assigned to the particular hotword, wherein the electronic document specifies multiple instances of the particular hotword, wherein at least two instances of the particular hotword specified in the electronic document are associated with a different set of operations from among the multiple sets of operations assigned to the particular hotword.

13. The computer system of claim 1, wherein the hotword instruction in the code for the electronic document indicates an intent of an author of the electronic document, before the electronic document is served to the computing system, to activate the hotword detection capability for the particular hotword.

14. The computer system of claim 1, wherein the hotword instruction is exclusively arranged to activate the hotword detection capability for the particular hotword and is independent of any other capability in the presentation of the electronic document.

15. A computer-implemented method comprising:
   storing information that indicates, for each hotword of a plurality of hotwords, information that maps a unique identifier of the hotword to a visual representation of the hotword, wherein the visual representation of a first hotword of the plurality of hotwords is visually different from the visual representation of a second hotword of the plurality of hotwords;
   receiving, from an application on a computing device and based on the application having identified in code for an electronic document a hotword instruction that is dedicated to activating a hotword capability for a particular hotword of the plurality of hotwords identified by the hotword instruction, a request for the visual representation of the particular hotword, the request identifying the particular hotword by its unique identifier;
   retrieving, using the unique identifier of the particular hotword as specified in the request, the visual representation of the particular hotword from among the visual representations of the plurality of hotwords; and
   returning, to the application and in response to the request, the visual representation of the particular hotword,
   wherein the application is configured to render a presentation of the electronic document in which the hotword capability for the particular hotword is activated, including showing the visual representation of the particular hotword in the presentation of the electronic document and enabling the application to respond to instances of spoken input that correspond to the particular hotword.

16. The computer-implemented method of claim 15, further comprising:
receiving, from a hotword detector, an indication of spoken input that corresponds to the particular hotword; and
sending, to the application and in response to receiving the indication of the spoken input, information to cause the application to perform one or more operations associated with the particular hotword.

17. The computer-implemented method of claim 15, wherein the application comprises a web browser and the unique identifiers for the plurality of hotwords are identified from markup code for a webpage that is loaded by the web browser.

18. The computer-implemented method of claim 15, wherein the visual representations for the hotwords comprise text of one or more terms that indicate respective actions associated with the hotwords.

19. The computer-implemented method of claim 15, further comprising identifying a geographic location or a language associated with the request, wherein retrieving the visual representation of the particular hotword comprises selecting the visual representation for the particular hotword from among multiple available visual representations for the particular hotword based on the geographic location or the language associated with the request, wherein each of the available visual representations for the particular hotword is associated with a respective geographic location or language.

20. One or more non-transitory computer-readable media having instructions stored thereon that, when executed by one or more processors, cause the one or more processors to perform operations comprising:
storing information that indicates, for each hotword of a plurality of hotwords, information that maps a unique identifier of the hotword to a visual representation of the hotword, wherein the visual representation of a first hotword of the plurality of hotwords is visually different from the visual representation of a second hotword of the plurality of hotwords;
receiving, from an application on a computing device and based on the application having identified in code for an electronic document a hotword instruction that is dedicated to activating a hotword capability for a particular hotword of the plurality of hotwords identified by the hotword instruction, a request for the visual representation of the particular hotword, the request identifying the particular hotword by its unique identifier;
retrieving, using the unique identifier of the particular hotword as specified in the request, the visual representation of the particular hotword from among the visual representations of the plurality of hotwords; and
returning, to the application and in response to the request, the visual representation of the particular hotword,
wherein the application is configured to render a presentation of the electronic document in which the hotword capability for the particular hotword is activated, including showing the visual representation of the particular hotword in the presentation of the electronic document and enabling the application to respond to instances of spoken input that correspond to the particular hotword.

* * * * *

UNITED STATES PATENT AND TRADEMARK OFFICE
CERTIFICATE OF CORRECTION

PATENT NO. : 10,102,848 B2
APPLICATION NO. : 14/206737
DATED : October 16, 2018
INVENTOR(S) : Koulomzin Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this
Twenty-third Day of July, 2019

Andrei Iancu
*Director of the United States Patent and Trademark Office*